United States Patent [19]

Means

[11] Patent Number: 5,589,901
[45] Date of Patent: Dec. 31, 1996

[54] APPARATUS AND METHOD FOR SYNCHRONIZING SEARCH AND SURVEILLANCE DEVICES

[76] Inventor: Kevin P. Means, 3126 Goldsmith St., San Diego, Calif. 92106

[21] Appl. No.: 441,121

[22] Filed: May 15, 1995

[51] Int. Cl.$^6$ .................................................. G03B 39/00
[52] U.S. Cl. ............................................ 396/12; 348/144
[58] Field of Search ............................... 354/65, 73, 74, 354/75, 76; 348/144

[56] References Cited

U.S. PATENT DOCUMENTS

| | | |
|---|---|---|
| 2,823,366 | 2/1958 | Schmitz, Jr. . |
| 3,641,261 | 2/1972 | Chaplin et al. .......................... 348/144 |
| 4,027,159 | 5/1977 | Bishop . |
| 4,084,083 | 4/1978 | McNally et al. . |
| 4,093,904 | 6/1978 | Burig et al. . |
| 4,245,298 | 1/1981 | Slater . |
| 4,319,306 | 3/1982 | Stanuch . |

OTHER PUBLICATIONS

Product Brochure "Slaved Searchlight System (Slass) Retrofit" by Dynametric Systems Co., Jan. 27, 1995.

*Primary Examiner*—David M. Gray
*Attorney, Agent, or Firm*—Brown, Martin, Haller & McClain

[57] ABSTRACT

A search and surveillance system is describes in which two separate devices, typically a searchlight and an infrared and/or video camera, can be directly linked electronically through one device's comparator, without inclusion of an intermediate coordinating device, so that a user's movement and positioning of one of the devices directly determines the movement and positioning of the other device. Either of the devices may be the master unit, although in most cases the searchlight will be the master unit. The invention allows the user to concentrate on monitoring the operation of the master unit with the slave unit automatically responding in unison. The system is primarily used on aircraft, especially helicopters. Preferred methods of use of the system are also disclosed. The system uniquely utilizes comparator circuitry already found in conventional gimbal/unit positioning devices. Linking of the positioning and control components of two units through the use of comparator circuitry common to present commercial search and surveillance units greatly simplifies the synchronization of multiple units, and avoids the use of additional complex and expense equipment, thus overcoming complexities and expense of previous devices.

21 Claims, 4 Drawing Sheets

APPARATUS AND METHOD FOR SYNCHRONIZING SEARCH AND SURVEILLANCE DEVICES

BACKGROUND OF THE INVENTION

1. Field of the Invention

The invention herein relates to lights and infrared and video cameras used for search and surveillance, particularly from aircraft. More specifically it relates to apparatus and methods for synchronizing the operation of such devices.

2. Description of the Prior Art

Use of aircraft, particularly helicopters, for aerial search and surveillance of terrain is commonplace. In search and rescue missions, for instance, the aircraft may be used to hunt for missing or lost persons in rural or wilderness locations, hunt for injured hikers or the like. While in some cases such missions are conducted only in daylight hours, in many cases they are also conducted through twilight and night hours, particularly when the person being sought is especially at risk because of age, infirmity or threatening weather conditions. Further, while usually the person being sought is actively seeking to be found and tends to make himself or herself as visible as possible to the aircraft crew, there are certainly many instances where the aircraft crew must actively hunt for the individual. This is true, for instance, where the missing person is a small child, a mentally impaired person or where the person has been injured and is either immobilized or unconscious.

As important as the foregoing situations are with respect to life and safety, they are conducted in an atmosphere of cooperation or at least neutrality between the aircraft crew and the person being sought. In law enforcement aerial search and surveillance, however, the atmosphere is one of adversarial circumstances accompanied by deliberate efforts on the part of the person being sought to avoid being found by the aircraft crew. Typical of such situations are a criminal fleeing from the scene of a crime or an illegal alien attempting to enter the country surreptitiously.

Various governmental agencies maintain one or more aircraft for such search and surveillance purposes, including but not limited to the U.S. Coast Guard, the Border Patrol of the U.S. Immigration and Naturalization Service, the U.S. National Park Service, and numerous federal, state and local law enforcement agencies. In most cases, these aircraft are helicopters of various types, because of the mobility and versatility of helicopters as compared to fixed wing or even vertical takeoff and landing (VTOL) aircraft. Therefore, to exemplify the invention in the description herein, it will be assumed that the aircraft in question is a helicopter, and, as is typical, that the helicopter has a two person crew, a pilot and an observer.

Search and surveillance helicopters are commonly equipped with two principal types of search and surveillance devices. The first is a high intensity lamp such as a searchlight, mounted in motorized gimbals on the outside of the helicopter and controlled by the observer sitting in the helicopter The observer looks through the helicopter windows and watches the projection of the searchlight on the ground, to follow the movements of a person or a vehicle on which the searchlight is focused. The observer also simultaneously watches through the helicopter windows for surrounding activity, particularly when monitoring the movements and presence of vehicles other than the target vehicle during a pursuit.

The other major type of device carried by search and surveillance helicopters is a video camera, an infrared camera, or a combination of the two. Such cameras are also mounted in motorized gimbals on the outside of the helicopter, but are mounted independently of the searchlight mounting. Both devices send their images to a video monitor mounted inside the helicopter and watched by the observer. The infrared camera is used for detecting persons in the dark or when they are not readily visible because of camouflage or hiding in brush, areas of debris, litter, construction, etc. As is well known, infrared cameras detect targets by thermal radiation differences between the target object and the background, the most common of which is to detect a person's body heat against the cooler background of his or her surroundings. Video cameras are used primarily to obtain a record of the search and surveillance, such as in vehicle pursuits where the target vehicle's speed and movements are recorded for subsequent law enforcement or prosecution purposes.

In most instances, it is important for the observer to use both the searchlight and camera simultaneously, to take advantage of the synergistic effect of the different capabilities of the various types of equipment. However, since the searchlight beam, the terrain and other surroundings must be monitored by watching through the helicopter windows, while the infrared and/or video camera's image must be watched on the video monitor within the helicopter, it is extremely difficult for the observer to handle both things at the same time, particularly since he or she must also simultaneously operate two different hand controls to aim the searchlight and camera in the desired directions.

Merely physically mounting the searchlight and the camera together physically, in a manner such as that depicted in U.S. Pat. No. 4,027,159, is not a practical solution, since in many cases it is necessary or desirable to have the camera aimed in a different direction from the searchlight. For instance, when pursuing a fugitive through brush, law enforcement officers often want to detect the fugitive with the infrared camera but avoid having the fugitive aware that his presence has been detected. To do this the searchlight is aimed in a different direction from the camera so that the fugitive, seeing the light beam some distance away, thinks detection has been successfully avoided.

There have in the past been several types of systems which have been disclosed for operating two or more externally mounted pieces of equipment on a helicopter to be operated simultaneously or in conjunction with each other. Typical examples include a camera system for aiming weapons from a helicopter gunship which is disclosed in U.S. Pat. No. 3,641,261. In this system, the cameras are fixed in position, and the pilot and copilot must cooperate in using mirrors to aim movable gun turrets in unison. The system is complex and cannot be operated by a single person. Other systems include those shown in U.S. Pat. Nos. 4,084,083; 4,093,904 and 4,245,298. All of these systems, however, are also quite complex, in that they rely on the inclusion of an additional device to receive and coordinate signals from each of separate search and surveillance devices, and then independently operate each device (e.g., weapons turrets or camera). Thus, each search and surveillance device is separately operated by the coordinating unit, rather than having one of the search and surveillance devices (the "master") directly control the synchronization of the other device (the "slave"). In addition, such systems are expensive because Of the additional equipment needed, and failure of the coordinating unit can render the individual devices and the entire system inoperative.

SUMMARY OF THE INVENTION

The invention herein overcomes the complexities and expense of the prior art systems, with a minimum of equipment and by utilizing circuitry which is already part of commercial devices or unit. It provides a search and surveillance system in which two separate devices or units, typically a searchlight and an infrared and/or video camera, can be directly linked electronically through the system's comparison ("comparator") circuitry, without inclusion of an intermediate coordinating device, so that an observer's movement and positioning of one of the devices directly synchronizes the movement and positioning of the other device. While in most circumstances the searchlight will be used as the master unit and the camera(s) will be the slave unit, in this invention either of the devices may be the master unit and the other may be the slave unit. The invention allows the observer to concentrate on monitoring the location of one of the searching tools, either the searchlight beam or the infrared image, as the occasion demands, knowing that the positioning of the other unit will automatically respond in unison to his or her control and operation of the monitored unit.

As noted, the invention for brevity will be exemplified by use with a helicopter with a two person crew, a pilot and an observer. Those skilled in the art will of course immediately recognize that the system of this invention is usable in aircraft of many types, including fixed wing and VTOL aircraft, used for low level terrain search and surveillance. It is also possible that the present invention could be used in land vehicles, such as law enforcement or military trucks or similar vehicles which could be equipped to track or detect criminals, illegal aliens or enemy military personnel.

The system may serve a number of important functions, including aerial search and surveillance of persons such criminals, illegal aliens or similar fugitives, or of lost or missing persons, in various types of terrain, or monitoring and control of vehicle highway or street pursuits by law enforcement officers.

A major and unique element of the invention is the use of the circuitry already found in conventional gimbal/unit positioning devices to allow an operator's control and positioning of one unit to simultaneously directly control and position a companion unit. Linking of the positioning and control components of two units through the use of comparison circuitry common to present individual commercial search and surveillance units greatly simplifies the synchronization of multiple units, and avoids the requirement found in the prior art systems that additional complex and expense equipment must be incorporated into a system to permit such synchronization of movement and positioning.

In one principal embodiment, the invention involves apparatus for search and surveillance from a moving vehicle by an observer within said vehicle, which comprises a lamp projecting a directable beam of visible light, said lamp being mounted in a movable lamp gimbal attached to the exterior of said vehicle, and said beam being visible to said observer from within said vehicle; lamp positioning means for positioning said lamp gimbal to aim said beam of visible light and of said camera to aim said camera at said object; control means operable by said observer for controlling said lamp positioning means to position said lamp gimbal; and a pair of lamp gimbal signal generators generating respectively an azimuth position signal and an altitude signal indicating respectively the azimuth position and the altitude position of said lamp within said lamp gimbal; a camera for detecting an image of any object in light of visible or infrared wavelength, said camera being mounted in a movable camera gimbal attached to the exterior of said vehicle, and said image of said object being visible to said observer from within said vehicle; camera positioning means for positioning said camera gimbal to aim said camera at said object; control means operable by said observer for controlling said camera positioning means to position said camera gimbal; and a pair of camera gimbal signal generators generating respectively an azimuth position signal and an altitude signal indicating respectively the azimuth position and the altitude position of said camera within said camera gimbal; a comparator for comparing said position signals from said camera and lamp gimbal signal generators with each other, and in response thereto causing said positioning means of one of said lamp or camera gimbals to move into alignment with the other of said lamp or camera gimbals; said comparator also alternately comparing said position signals of said camera gimbal signal generator with predetermined position signals generated by a manually tunable signal generator; whereby said comparator alternately permits synchronized positioning of said lamp and said camera or predetermined positioning of said camera independently of positioning of said lamp.

In another principal embodiment, the invention involves a method for conducting search and surveillance from a moving vehicle by an observer within said vehicle, which comprises: providing a lamp projecting a directable beam of visible light, said lamp being mounted in a movable lamp gimbal attached to the exterior of said vehicle, and said beam being visible to said observer from within said vehicle; lamp positioning means for positioning said lamp gimbal to aim said beam of visible light and of said camera to aim said camera at said object; control means operable by said observer for controlling said lamp positioning means to position said lamp gimbal; and a pair of lamp gimbal signal generators generating respectively an azimuth position signal and an altitude signal indicating respectively the azimuth position and the altitude position of said lamp within said lamp gimbal; providing a camera for detecting an image of any object in light of visible or infrared wavelength, said camera being mounted in a movable camera gimbal attached to the exterior of said vehicle, and said image of said object being visible to said observer from within said vehicle; camera positioning means for positioning said camera gimbal to aim said camera at said object; control means operable by said observer for controlling said camera positioning means to position said camera gimbal; and a pair of camera gimbal signal generators generating respectively an azimuth position signal and an altitude signal indicating respectively the azimuth position and the altitude position of said camera within said camera gimbal; providing a comparator for comparing said position signals from said camera and lamp gimbal signal generators with each other, and in response thereto causing said positioning means of one of said lamp or camera gimbals to move into alignment with the other of said lamp or camera gimbals; said comparator also alternately comparing said position signals of said camera gimbal signal generator with predetermined position signals generated by a manually tunable signal generator; and operating said comparator alternately to cause synchronized positioning of said lamp and said camera or to cause predetermined positioning of said camera independently of positioning of said lamp.

DETAILED DESCRIPTION AND PREFERRED EMBODIMENTS

The invention is best understood by reference to the drawings. As has been noted above, the invention is exemplified by use in conjunction with a helicopter mounted searchlight and infrared/video camera system. It will be understood, however, that either the video camera or the infrared camera may be eliminated and the remaining unit used in conjunction with the searchlight. Other combinations of equipment for which it is desirable to have the ability of coordinated operation will also readily come to mind for those skilled in the art.

Figure 1:
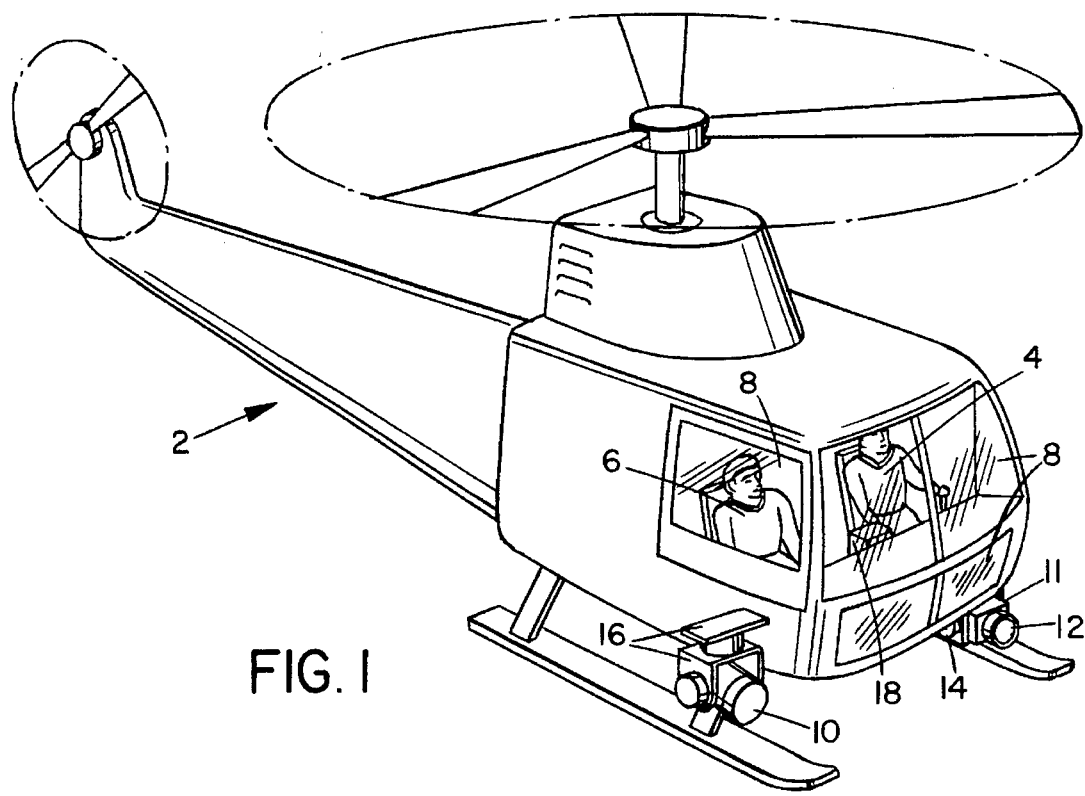
FIG. 1 is a pictorial view of a helicopter illustrating the external mountings of a searchlight and a camera system.

Considering first FIG. 1, a search and surveillance helicopter 2 is illustrated, typical of the type commonly used by law enforcement agencies. The crew consists of pilot 4 and observer 6 who can view the terrain below (open, brushy or wooded land; water; urban streets; etc.) and outside external surroundings through windows 8. Mounted on the outside of the helicopter are a searchlight 10 and a camera pod 11 housing a camera 12, mounted respectively on motorized gimbals 14 and 16, which will be described in more detail below. Within the helicopter cabin is a video monitor 18 which receives an image signal from the camera 12 and displays a visible representation of that image being projected by the camera 12. Also within the helicopter cabin are hand controls (described below) for the motorized gimbals to be operated by the observer.

Figure 2:
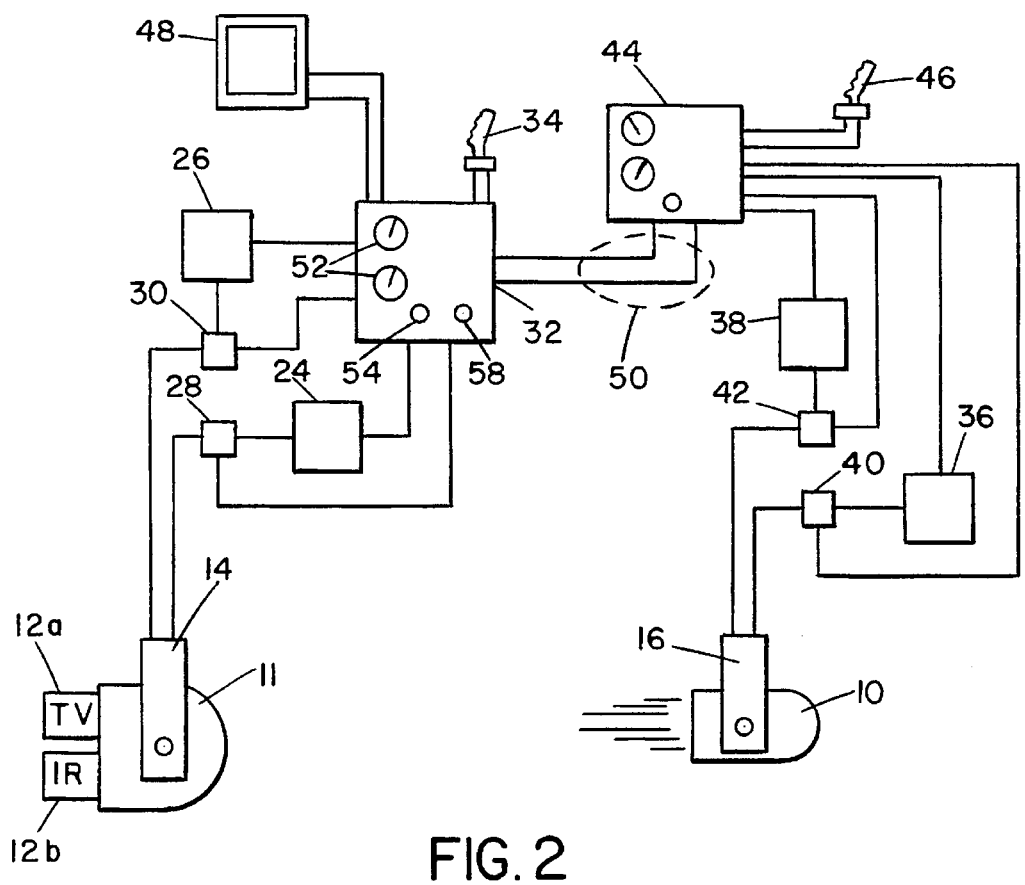
FIG. 2 is a schematic diagram indicating the linkage between the motor control system for the searchlight the motor for the camera(s).

Turning now to FIG. 2, the searchlight 10 is shown mounted in its gimbal 16 and the camera pod 11 is shown mounted in its gimbal 14. In FIG. 1, a single camera 12, which can be either an infrared camera or a video camera, is shown mounted in the camera pod 11. In FIG. 2, however, two separate cameras are shown mounted in the pod 11, a video camera 12a and an infrared camera 12b. It is also possible to utilize a single camera lens system with both infrared and visible light detectors in a single unit. The exact nature of the searchlight or the camera or cameras is not critical to the present invention. Any high intensity lamp or camera commercially available, capable of being fitted onto and controlled from the helicopter 2, and useful for airborne search and surveillance may be used.

Figure 6:
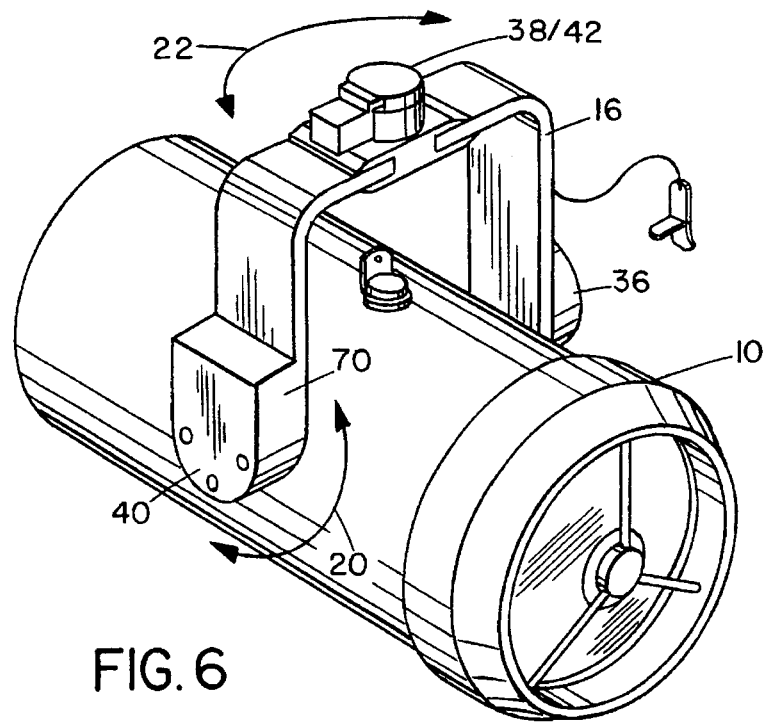
FIG. 6 is a perspective diagram illustrating the attachment of motor and sensors for the motorized gimbal of a searchlight.

Gimbal 16 allows the searchlight 10 to be moved in an altitude coordinate and in an azimuth coordinate (as indicated respectively by arrows 20 and 22 in FIG. 6). The altitude movement is driven by reversible motor 36, while the azimuth movement is driven by reversible motor 38. The two motors also are connected respectively to location sensing devices 40 and 42, both of which are operatively connected to control unit 32 and send signals to control unit 32 identifying precisely the altitude and azimuth coordinates of the searchlight 10 at any time. The observer uses controller 46 (usually a joystick) to operate motors 36 and 38 together or independently to move gimbal 16 and to aim searchlight 10 in the desired direction.

A substantially identical system but independent system is used for camera pod 11. Motors 24 and 26, respectively, drive the gimbal 14 and camera pod 11 in altitude and azimuth movements, and sensors 28 and 30 signal the respective coordinates to control unit 32, with the observer controlling the operation of motors 24 and 26 by controller 34 while watching the image from camera 12 (or cameras 12a and 12b) on monitor 48.

In the prior art systems, controllers 32 and 44 were not linked directly together. They were either not linked at all, and the systems were operated independently, or they were linked only through complex additional pieces of equipment as disclosed in the above-cited patents. The gist of the present invention lies in the direct and operable linkage of the two systems as indicated at 50 in FIG. 2, and which will be described in detail below.

Figure 3:
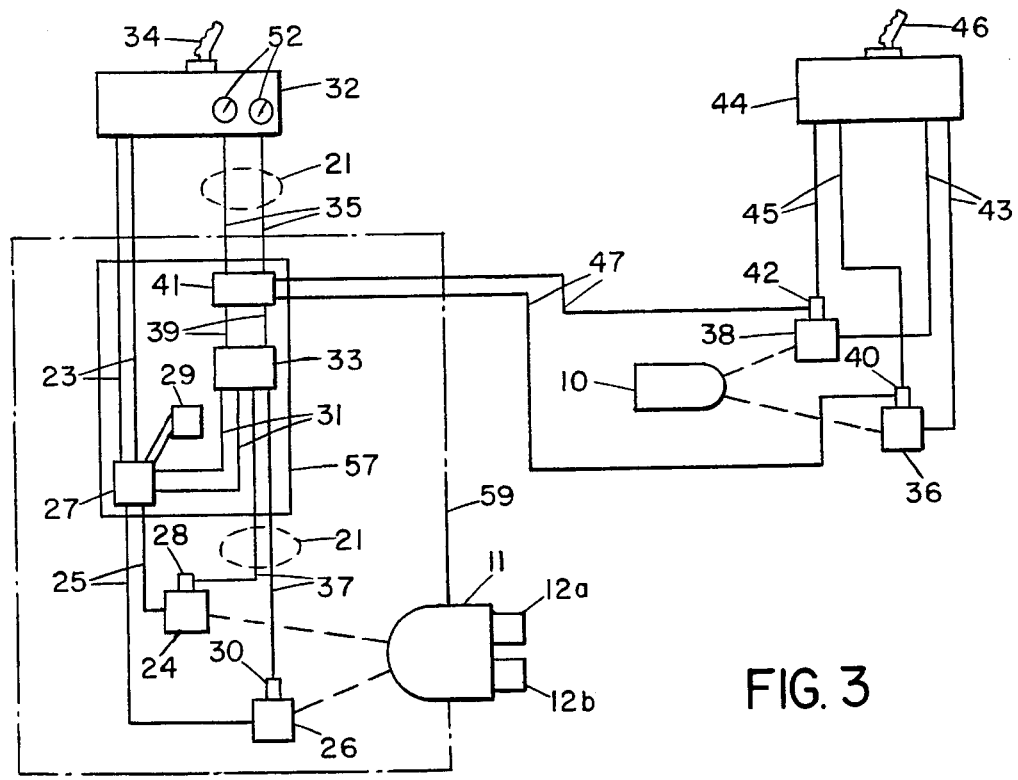
FIG. 3 is a schematic diagram illustrating the operation of the two units independently or simultaneously with the searchlight as the master unit.

In FIG. 3, the basic concept of the present invention is illustrated. In a conventional control system for a camera pod, there is a circuit which is intended to automatically move the camera pod to a predetermined orientation specified by hardwired coordinates or by coordinates preset by use of potentiometers. Such a circuit, which is often referred to as a "cage" or "stow" circuit, includes a comparison component such as integrated comparison circuitry, limit or location switches, etc., to enable the circuit to cause the pod to move from its last operating orientation into the predetermined orientation. This type of circuit, which is a critical element of the present invention, will for convenience herein be referred to as a "cage" circuit, and the predetermined position or orientation of the pod will be referred to as its "caged" position. It will be understood, however, that this terminology is not to be considered limiting, and that any circuit which performs the comparison and movement functions described herein, regardless of its designation, is to be considered equivalent for the purposes of this invention. Further, while in currently available commercial units comparator circuits are placed only in camera pod operating systems for "stowing," "caging", etc. of the camera pod, and are not used in searchlight operating circuits, those skilled in the art will immediately recognize that such comparator circuits can be incorporated into the searchlight systems and that the present invention can function with the comparator located in either unit and wired accordingly.

Turning then to FIG. 3, the cage circuit (generally indicated as 21) is essentially an override to controller 32 and joystick 34. During regular operation of a conventional camera pod, the observer uses control 34 and controller 32 as a direct control through wires 23 and 25 to motors 24 and 26 to orient the camera pod 11. Potentiometers 52, also in controller 32, are preset to provide the altitude and azimuth settings for the caged position of the pod. A switch 27 (which may also be in controller 32) allows the observer to alternate between the regular control circuit and the cage circuit 21. Normally switch 27 is aligned for the regular control to connect wires 23 and 25. When it is desired to move the pod to the caged position, however, the observer throws switch 27 to connect wires 25 to wires 31 and comparator unit 33. Comparator 33 is itself connected to wires 39 and through switch 41 (whose function will be described below) to potentiometers 52, and also to sensors 28 and 30 through wires 37. The function of comparator 33 is to compare the pod's azimuth and altitude positions as signaled by sensors 28 and 30 with the pre-set caged azimuth and altitude positions determined by potentiometers 52. Since any time the camera pod 11 is out of the caged position, the signalled values will be different, the comparator unit 33 sends signals through lines 31, switch 27 and lines 25 to operate motors 24 and 26 to move pod 11 until the positions signalled by the sensors 28 and 30 equal the positions determined by the potentiometers 52, which will occur only when the pod 11 has been returned to its caged position. When it is desired to put the camera pod back into operation, controller 34 is reactivated and comparator unit 33 is deactivated. Commonly commercial systems are built with joystick 34 being wired such that once the helicopter is airborne and the observer first moves joystick 34, that movement automatically throws switch 27, reactivates the operating circuit, and causes the pod to move out of its caged position.

A critical feature of the present invention is its utilization of these circuits which are already in place in commercial units, so that no separate "black boxes" or other auxiliary equipment need to be installed. Rather this invention, with the addition of several switches and some interconnecting wiring, allows conventional light and camera units to be interlinked in a master-slave relationship using only the circuitry already present in those units. In the crowded confines of a helicopter cabin, elimination of the extra equipment required by prior art devices is a clear and welcome advantage. Further, and most importantly, in the present system the observer controls the searchlight and camera pod with the units conventional controls, in the manner he or she has been familiar with, and does not have to cope with a third set of controls on some separate "dual-unit" controller, as is necessary with the prior art systems. In emergencies and the other high-stress situations present in police pursuits, searches for criminals and lost persons, etc., the observer can concentrate on the task at hand and continue using familiar controls for the units, and not risk errors or delays in having to manipulate a different set of controls on separate equipment.

FIG. 3 illustrates how the system is switched to the operating mode where the camera pod 11 is slaved to the searchlight control 44 so that when the observer uses joystick 46 to move the light 10 the camera pod 11 tracks in synchronization with the light. Basically this is accomplished by connecting the pod's cage circuit with the light controls. In FIG. 3 the light controller 44 with its joystick 46 is connected by wires 43 to light position motors 36 and 38, and by wires 45 to light position sensors 40 and 42. When the light and camera units are not interconnected, this portion of the system allows for independent operation of the light 10. In the present invention, wires 47 are added to connect switch 41 with sensors 40 and 42. To slave the camera pod 11 to the searchlight 10, the observer throws switch 27 to activate the camera pod's cage circuit and also throws switch 41 to disconnect comparator 33 from potentiometers 52 and connect it to sensors 40 and 42. The comparator 33 then compares the position signals from sensors 40 and 42 with the signals from sensors 28 and 30 and operates motors 24 and 26 to align the camera pod 11 with the positions indicated by the sensors 40 and 42. Since sensors 40 and 42 signal the altitude and azimuth of the light 10, the camera pod 11 thus aligns with the light and remains slaved to the light until switch 41 is re-thrown to connection with cage potentiometers 52. (Switch 29 is incorporated to lock switch 27 in the cage circuit position, and prevent accidental movement of joystick 34 from overriding switch 27 and disconnecting the cage circuit 21.)

Figure 4:
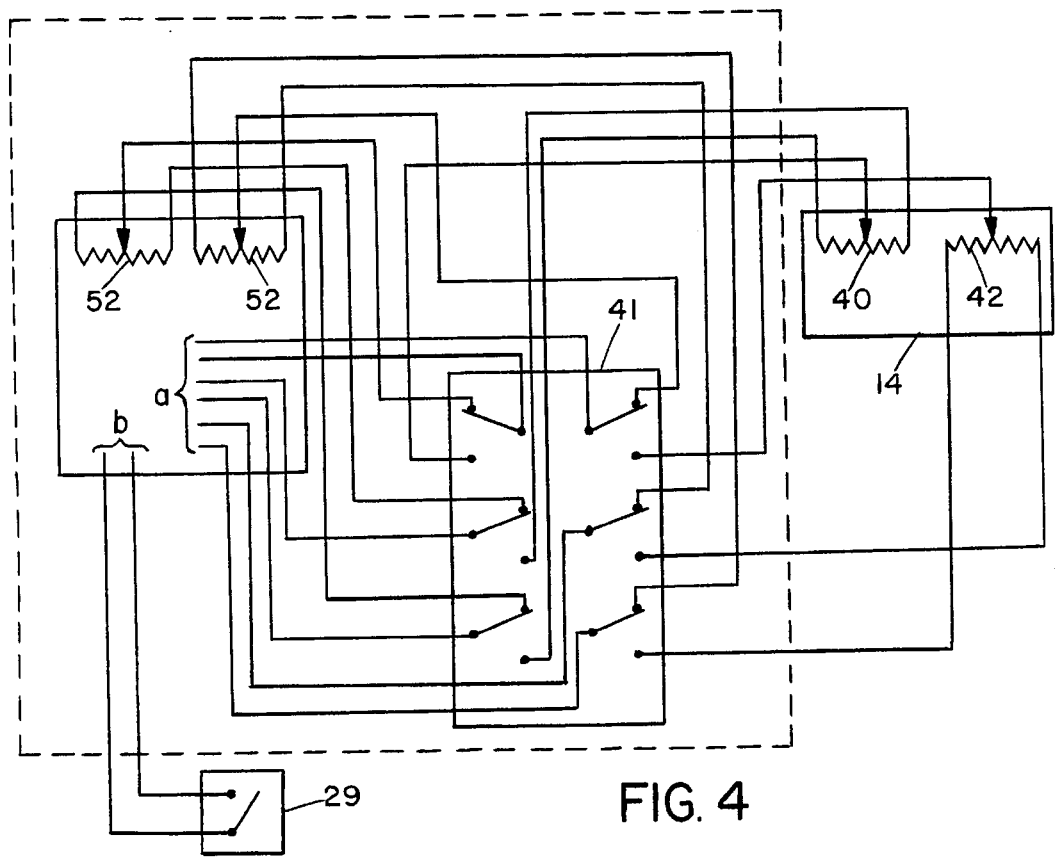
FIG. 4 is a circuit diagram illustrating a portion of the circuitry between the master unit and the slave unit of the embodiment of FIG. 3.

FIG. 4 shows details of one embodiment of the actual wiring used to obtain the interconnection through switch 41. The letter "a" indicates the incoming wires such as 39 normally routed directly to potentiometers 52. In the present invention, those are now routed to switch 41, from which two sets of wires are routed alternatively to sensors 40 and 42 and potentiometers 52. The normal switch contact settings indicated in FIG. 4 are for independent operation of the light and the camera pod; it will be evident that throwing switch 41 will disconnect potentiometers 52 and interconnect the light and camera control circuits. Switch 29 is also shown, with its connection at "b" going to switch 27. A dotted line indicates that the potentiometers 52 and switch 41 can be in a single location, such as controller 32, if desired.

Figure 5:
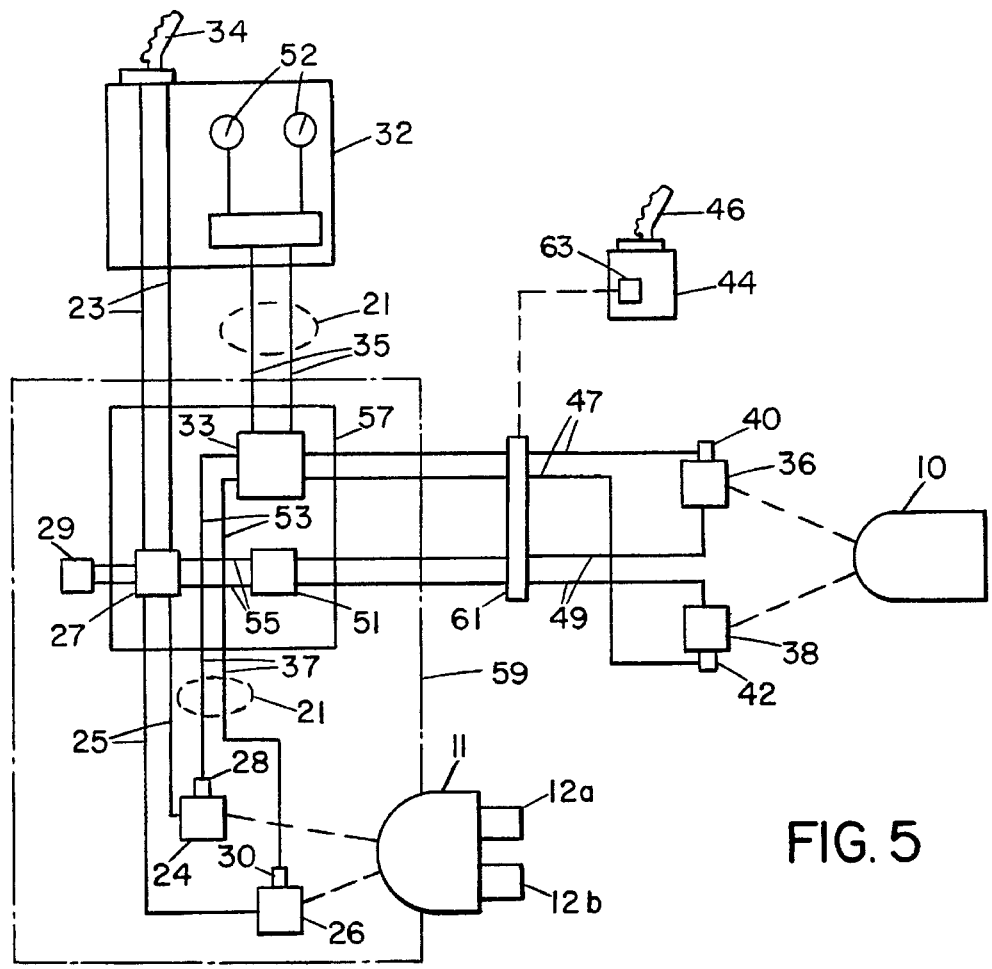
FIG. 5 is a schematic diagram similar to FIG. 3 but illustrating the operation of the two units independently or simultaneously with the camera(s) as the master/unit.

FIG. 5 shows an opposite embodiment from that of FIG. 3, in that in FIG. 5 it is the camera pod 11 that is the master and the searchlight 10 that is the slave. In this embodiment, both the regular operating circuit and the cage circuit 21 for the motors 24 and 26 of the camera pod 11 are in operation simultaneously, with the comparator 33 being used to operate the searchlight positioning motors 36 and 38. Comparator 33 is attached to four sets of wires: 33, 35, 47 and 53. Wires 53 lead to switch 51. When the light and camera pod are not interconnected, switch 51 is set to connect comparator 33 to switch 27 through wires 55, so that the cage circuit 21 operates as described for FIG. 3, and wires 53 and 55 and switch 51 function as wires 31 in FIG. 3. If the light 10 is to be slaved to the camera pod 11, however, switch 51 is thrown so that motor control signals from comparator 33 pass through wires 49 to searchlight positioning motors 36 and 38. Comparator 33 also is operably connected with switch 51 so that when switch 51 is connected to wires 55, comparator 33 is connected to wires 35 from potentiometers 52 and disconnected from wires 47, and when switch 51 is connected to wires 49, comparator 33 is connected to wires 47 from light position sensors 40 and 42 and disconnected form wires 35. Switch 29 is set to lock switch 27 in position for control of camera pod 11 by joystick 34, so that operation of the cage circuit to control the light 10 will not override the setting of switch 27. In operation therefore, this embodiment works by control of camera pod 11 by joystick 34 as described above. Simultaneously switch 51 is set so that comparator 33 receives pod positioning signals from sensors 26 and 28 through wires 37 and light positioning signals from sensors 40 and 42, but does not receive any signals from potentiometers 52. Comparator 33 detects any difference in the positions of the light and the pod by comparison of the signals from sensors 28 and 30 with those from sensors 40 and 42, and then sends motor operation signals through wires 53. However, since switch 51 thrown to be operably connected to wires 49 instead of wires 55, the signals operate light motors 36 and 38 to move the light 10, which thus tracks the pod's movements.

Member 57 is indicated as a base or housing for difference switch components if desired, and dotted line 59 indicates that a number of components can be housed inside the camera pod and gimbal unit, also if desired. Alternatively, many of the components shown can be mounted elsewhere, preferably in controller 32. For instance, while motors 24 and 26 will be on gimbal 14, any or all of switches 27, 29, 41 and 51, and comparator 33, may all be in controller 32.

Figure 8:
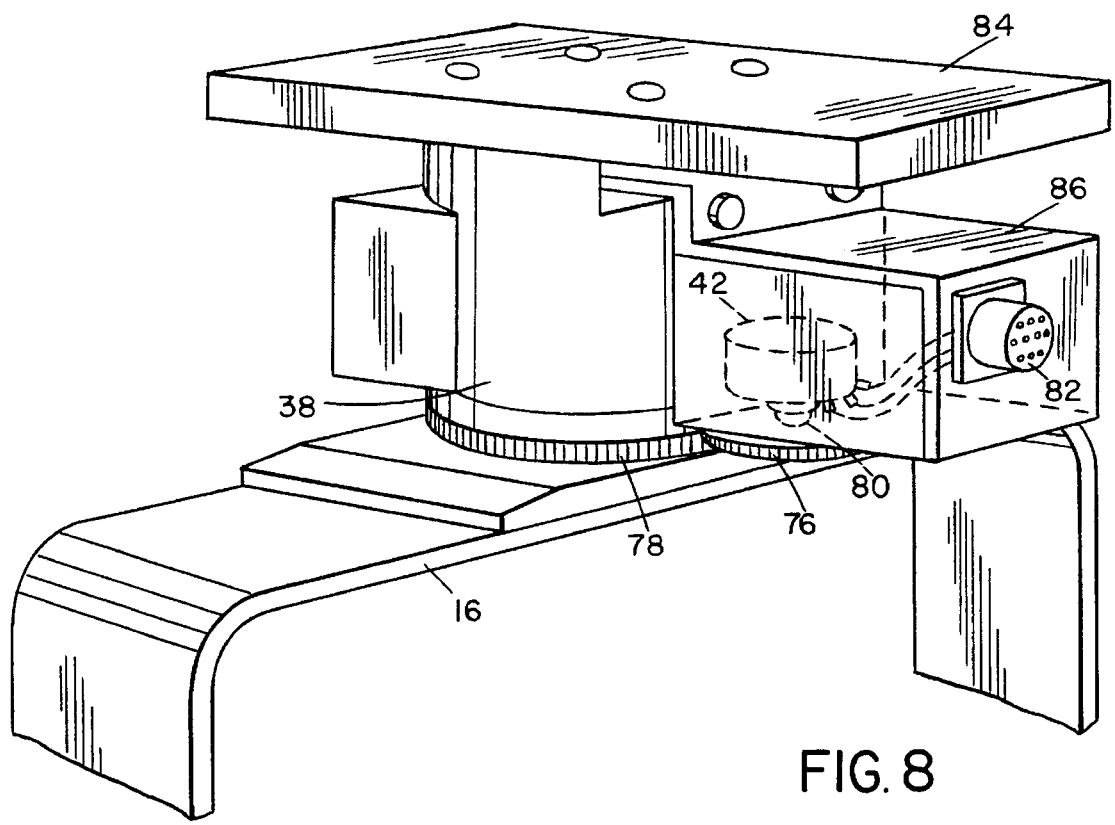
FIG. 8 is a perspective view, partially cut away, illustrating the mechanism for the azimuth control of the searchlight position of FIG. 6.
Figure 7:
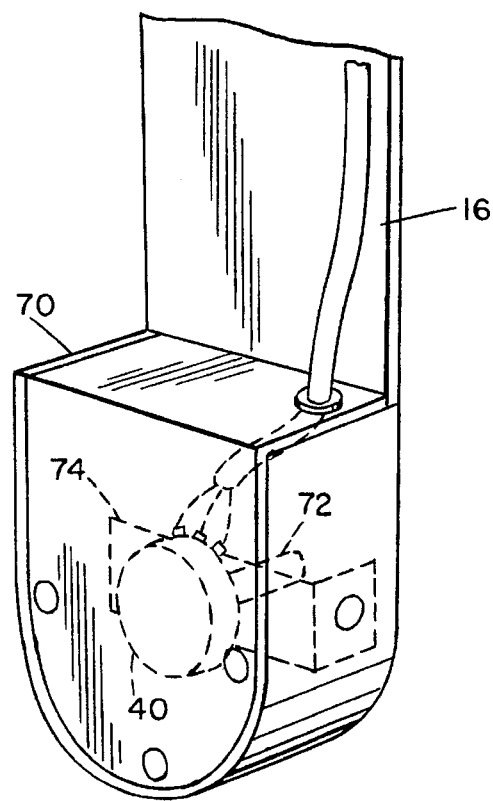
FIG. 7 is a perspective view, partially cut away, illustrating the mechanism for the altitude aspect of the searchlight position of FIG. 6.

FIGS. 6, 7 and 8 illustrate an embodiment of the system in which the gimbal position sensors are a potentiometer linked directly to the searchlight 10 or camera pod 11 (for altitude) and a potentiometer linked to gears incorporated in the gimbal driving mechanism for azimuth. In FIG. 6, the altitude driving motor 36 is mounted on one side of the U-shaped gimbal 16 and connected directly through a pivot to the searchlight 10. The present invention adds another housing 70 on the opposite side of the gimbal 16 in which potentiometer 40 is attached directly by pivot shaft 72 to the light 10, and is held in place by bracket 74 within the housing 70. As the motor 36 moves the searchlight 10 in altitude, potentiometer 40 also moves so that its position is always a function of the elevation of the searchlight 10. For convenience, the various potentiometers are designed for less than 360° rotation, usually extending no more than about 330° for the normal range of altitude position of the light 10. Similarly, as seen in FIG. 8, a potentiometer 42 is attached to gear 76 by shaft 80, and gear 76 in turn is meshed with gear 78 which is attached to the drive motor 38 for the azimuth control. Conveniently, the potentiometer 42 is enclosed in a housing 86 and the sensor leads are run to a plug 82 on the outside of the housing 86 for convenience in making the various connections. In addition, gimbal 16 is conveniently slidably mounted on a quick disconnect mount 84 which is permanently attached to the side of the helicopter, so that the searchlight assembly can be readily disconnected and removed from the helicopter for maintenance, repair or replacement. (FIGS. 6, 7 and 8 illustrate the searchlight gimbal 16 with respect to describing altitude and azimuth motions and mechanisms and mounting of camera pod 11.)

Other embodiments and uses may also be seen from FIGS. 3 and 5. The system can be used in two ways for tracking a fugitive when the helicopter crew do not want the criminal to be aware that he or she has been detected. If light 10 is turned off, but its motors 36 and 38 are operational, the observer can traverse the infrared camera 12b in a searching pattern until the fugitive is located by the infrared camera, either by making the camera pod the master as in FIG. 5 or by making the searchlight (even though turned off) the master as in FIG. 3. The crew can then radio for assistance of law enforcement officers on the ground, identifying for them the route of the fugitive so that the ground officers can determine an appropriate location to intercept and capture the fugitive. When the fugitive has been tracked with the camera 12b to the interception point, the observer can turn on the light 10 which, since the camera pod and light have been interconnected during the surveillance, has therefore been pointed at the fugitive all along, and now illuminates the fugitive for capture by the ground officers. The difference between these two procedures is essentially in whether the observer manipulates joystick 46 to move the light as master and observes the pursuit through the helicopter window or manipulates joystick 34 and with the pod as master and observes the pursuit on monitor 48. The former is usually preferable since the observer can then also observe terrain and other conditions outside the helicopter, as well as observing the pursuit of the fugitive.

In a related embodiment, illustrated in FIG. 5, if a ganged off-on switch 61 was placed in wires 47 and 49 and controller 44 included its own off-on switch 63, one could throw switch 61 to block signals through wires 47 and 49 and use the light control joystick to position light 10 with its beam pointed in some direction other than the intended aiming point of the camera. Switch 63 is then turned off to temporarily lock light 10 in that position. Thereafter, when it is desired to bring the light beam into alignment with the camera, switch 61 is opened and the comparator 33, now receiving the signals from sensors 40 and 42, immediately signals motors 36 and 38 to move the light 10 to align with the camera. With controller 44 off, there are no competing operational signals to the light positioning motors. This would be useful, for instance, if the crew want to deceive the fugitive, by seeing the light beam pointed, into being unaware that he or she is being tracked by infrared light, since he or she sees only the light beam of the searchlight 10 pointing in a completely different direction.

When it is desired to take the helicopter out of service after a pursuit or search and rescue mission has been completed or suspended, switch 41 (FIG. 3) or switches 51 and 61 (FIG. 5) can be opened, allowing each unit to be independently under control of its own control system and joystick. Switch 29 is also usually turned off so that the cage and operating circuits for the camera can be interlinked normally. Thereafter, when it is desired to cage the camera pod 11 for landing, the camera pod motors 24 and 26 respond to the position signals of the caging potentiometers 52 and move the pod to its caged position.

The present system therefore efficiently uses the comparison circuitry already present in commercial systems and uniquely joins them in a manner not heretofore known, so that the observer needs only to monitor and control the position of one of the two units, knowing that the other unit will either be tracking synchronously or will be positioned at a known position from which it can be quickly and accurately brought into alignment with the master unit simply by operating usually only a single switch. The observer can thus devote attention to controlling whichever unit is most appropriate in the circumstances to allow the other unit to be slaved with a predetermined relationship to the master unit, including being in a stationary stand-by position, and then when it is time to bring both units into alignment, that synchronized alignment can be accomplished by the simple push of a button.

It will be noted that in FIGS. 6, 7 and 8 the sensor devices are electromechanical devices, exemplified as potentiometers and gear drives. However, it is contemplated that electronic sensors can easily be used for the same purposes, incorporating an inertial or magnetic field feature such that any movement of the helicopter or of the gimbals will be sensed by the electronic sensors as differences from the initial positions. Such sensors will normally have memory circuitry built in, so that (in the same manner as the movement of the gears is a form of memory) the electronic sensors would continue to track changes in position regardless of switch settings, and would retain location information when the helicopter is parked or hangared. Such memories could be provided with updated or revised information if units are moved to other aircraft or vehicles, or if a helicopter or other vehicle is transported to a new location.

It will be evident that there are numerous embodiments of this invention which, while not specifically described herein, are clearly within the scope and spirit of the invention. The above description is therefore intended to be exemplary only, and the actual scope of the invention is to be determined solely by the appended claims.

I claim:

1. Apparatus for search and surveillance from a moving vehicle by an observer within said vehicle, which comprises:

a lamp projecting a directable beam of visible light, said lamp being mounted in a movable lamp gimbal attached to the exterior of said vehicle, and said beam being visible to said observer from within said vehicle; lamp positioning means for positioning said lamp gimbal to aim said beam of visible light and of said camera to aim said camera at said object; and a pair of lamp gimbal signal generators generating respectively an azimuth position signal and an altitude signal indicating respectively the azimuth position and the altitude position of said lamp within said lamp gimbal;

a camera for detecting an image of any object in light of visible or infrared wavelength, said camera being mounted in a movable camera gimbal attached to the exterior of said vehicle, and said image of said object being visible to said observer from within said vehicle; camera positioning means for positioning said camera gimbal to aim said camera at said object; and a pair of camera gimbal signal generators generating respectively an azimuth position signal and an altitude signal indicating respectively the azimuth position and the altitude position of said camera within said camera gimbal;

control means operable by said observer for controlling said lamp positioning means to position said lamp gimbal;

a comparator for comparing said position signals from said camera and lamp gimbal signal generators with each other, and in response thereto causing said positioning means of said camera gimbal to move said camera into alignment with said lamp;

said comparator also alternatively comparing said position signals of said camera gimbal signal generator with predetermined position signals generated by a manually tunable signal generator;

whereby said comparator permits synchronized positioning of said camera with said lamp or predetermined positioning of said lamp independently of positioning of said camera.

2. Apparatus for search and surveillance as in claim 1 wherein said comparator is part of said camera positioning means.

3. Apparatus for search and Surveillance as in claim 1 wherein during synchronized positioning of said lamp and said camera positioning signals from said manually tunable signal generator are blocked from reaching said comparator.

4. Apparatus for search and surveillance as in claim 1 wherein during independent positioning of said camera positioning signals from said lamp gimbal signal generator are blocked from reaching said comparator.

5. Apparatus for search and surveillance as in claim 1 wherein said vehicle is an aircraft.

6. Apparatus for search and surveillance as in claim 5 wherein said aircraft is a helicopter.

7. Apparatus for search and surveillance as in claim 5 wherein said beam of light illuminates an area of terrain adjacent said aircraft visible to said observer from within said aircraft.

8. Apparatus for search and surveillance as in claim 5 wherein said camera detects an image of an object on terrain adjacent said aircraft.

9. Apparatus for search and surveillance as in claim 8 wherein said object is detected in light of visible wavelength.

10. Apparatus for search and surveillance as in claim 8 wherein said object is detected in light of infrared wavelength.

11. Apparatus for search and surveillance as in claim 8 wherein said image of said object is transmitted by said camera to visual monitoring means within said aircraft and visible to said observer.

12. A method for conducting search and surveillance from a moving vehicle by an observer within said vehicle, which comprises:

a. providing a lamp projecting a directable beam of visible light, said lamp being mounted in a movable lamp gimbal attached to the exterior of said vehicle, and said beam being visible to said observer from within said vehicle; lamp positioning means for positioning said lamp gimbal to aim said beam of visible light and of said camera to aim said camera at said object; and a pair of lamp gimbal signal generators generating respectively an azimuth position signal and an altitude signal indicating respectively the azimuth position and the altitude position of said lamp within said lamp gimbal;

b. providing a camera for detecting an image of any object in light of visible or infrared wavelength, said camera being mounted in a movable camera gimbal attached to the exterior of said vehicle, and said image of said object being visible to said observer from within said vehicle; camera positioning means for positioning said camera gimbal to aim said camera at said object; and a pair of camera gimbal signal generators generating respectively an azimuth position signal and an altitude signal indicating respectively the azimuth position and the altitude position of said camera within said camera gimbal;

c. controlling said lamp positioning means to position said lamp gimbal;

d. providing a comparator for comparing said position signals from said camera and lamp gimbal signal generators with each other, and in response thereto causing said positioning means of said camera gimbal to move said camera into alignment with said lamp; said comparator also alternatively comparing said position signals of said camera gimbal signal generator with predetermined position signals generated by a manually tunable signal generator; thereby causing synchronized positioning of said camera with said lamp or predetermined positioning of said lamp independently of positioning of said camera.

13. A method for search and surveillance as in claim 12 further comprising blocking signals from said manually tunable signal generator from reaching said comparator during synchronized positioning of said lamp and said camera.

14. A method for search and surveillance as in claim 12 further comprising blocking signals from said lamp gimbal signal generator from reaching said comparator during independent positioning of said camera.

15. A method for search and surveillance as in claim 12 further comprising conducting said method from an aircraft.

16. A method for search and surveillance as in claim 15 further comprising conducting said method from a helicopter.

17. A method for search and surveillance as in claim 15 further comprising positioning said lamp such that said beam of visible light illuminates an area of terrain adjacent said aircraft visible to said observer from within said aircraft.

18. A method for search and surveillance as in claim 15 further comprising positioning said camera such that said lamp detects an image of an object on terrain adjacent said aircraft.

19. A method for search and surveillance as in claim 18 further comprising positioning said lamp such that said camera detects said image of said object in light of visible wavelength.

20. A method for search and surveillance as in claim 18 further comprising positioning said lamp such that said camera detects said image of said object in light of infrared wavelength.

21. A method for search and surveillance as in claim 18 further comprising transmitting said image of said object to visual monitoring means within said aircraft and visible to said observer.

* * * * *

UNITED STATES PATENT AND TRADEMARK OFFICE
CERTIFICATE OF CORRECTION

PATENT NO. : 5,589,901
DATED      : December 31, 1996
INVENTOR(S): KEVIN P. MEANS It is certified that error appears in the above-indentified patent and that said Letters Patent is hereby corrected as shown below:

COLUMN 12, CLAIM 18, LINE 63: REPLACE "CAMERA" WITH
    --LAMP--.

Signed and Sealed this

Twenty-ninth Day of July, 1997

Attest:

BRUCE LEHMAN

Attesting Officer

Commissioner of Patents and Trademarks